E. POSSON.
RAIL JOINT.
APPLICATION FILED SEPT. 30, 1905.
966,949.
Patented Aug. 9, 1910.
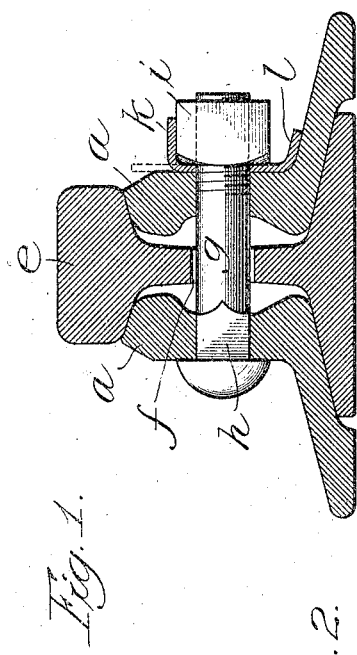
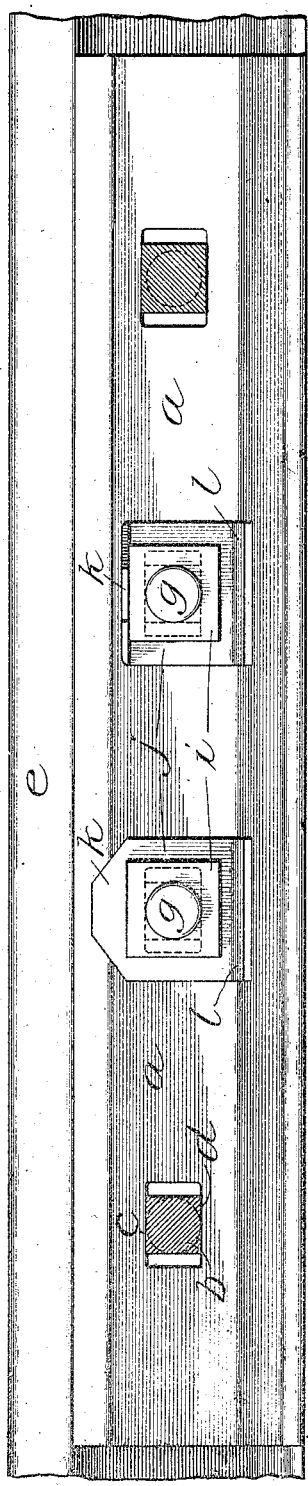
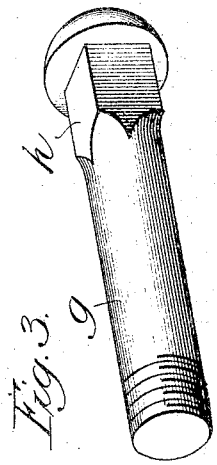
Witnesses:
Inventor:
Edward Posson.
By Thomas F. Sheridan,
Atty.

UNITED STATES PATENT OFFICE.

EDWARD POSSON, OF CHICAGO, ILLINOIS.

RAIL-JOINT.

966,949.

Specification of Letters Patent. Patented Aug. 9, 1910.

Application filed September 30, 1905. Serial No. 280,797.

*To all whom it may concern:*

Be it known that I, EDWARD POSSON, a citizen of the United States, residing at Chicago, in the county of Cook and State of Illinois, have invented certain new and useful Improvements in Rail-Joints, of which the following is a specification.

My invention relates to rail joints.

The principal object of the invention is to provide a simple, economical and efficient rail joint.

Other and further objects of the invention will appear from an examination of the drawings and the following description and claim.

The invention consists in the combinations and details hereinafter described and claimed.

In the accompanying drawings—Figure 1 is a transverse sectional elevation of a rail joint mechanism constructed in accordance with my improvements; Fig. 2 a side elevation thereof; and Fig. 3 a perspective view of one of the squared neck or shouldered bolts.

In constructing a device in accordance with my improvements, I provide fish plates or angles $a$ having perforations $b$ therethrough, which are oblong or elongated longitudinally of the fish plates, such perforations having upper wall portions $c$ and lower wall portions $d$ extending in parallel relation. The rails $e$, to be joined, are provided with perforations $f$, and bolts $g$ having squared or shouldered neck or shank portions $h$ forming shoulders, adapted to prevent the turning of the bolts, are inserted through the perforations in such angle irons and extend through the perforations in the rails. The squared neck or shank portions of the bolts are, preferably, oblong in cross section, as shown at the right of Fig. 2, being of such dimensions that the long sides of such squared neck portions engage the upper and lower walls, respectively, of the elongated perforations in the angle irons or fish plates, so as to be held against rotation thereby, thus preventing the loosening of the nuts upon the bolts. The perforations in the angle irons are of sufficient length to provide spaces on each side of the bolt neck which permit the movement of the bolts longitudinally of the plates with the expansion and contraction of the rails due to changes in temperature.

To provide additional security against the loosening of the nuts, nut locking members $j$ are provided having perforations through which the bolts extend, such locking members having upper outwardly projecting flange portions $k$ and lower outwardly projecting flange portions $l$. The upper flange portions engage the upper sides of the nuts and the lower flange portions engage the bottom flange portions of the angle irons or fish plates, so that such locking members are held against rotation and are adapted to prevent the rotation of the nuts upon the bolts. The perforations in the locking members $j$ may also be elongated longitudinally of the angle irons or fish plates, so as to permit the movement of the bolts longitudinally with relation to either the fish plates or rails and thus prevent injury to the parts by reason of the expansion and contraction of the rails. I prefer to elongate the perforations in the fish plates rather than those through the web portions of the rails, as the mechanism with all its advantages may thus be employed for connecting track rails of any ordinary type, without changing the rails in any respect.

The nut locking members may be placed in position before the upper flanges are bent and after the nuts $i$ are mounted in position and properly tightened, these flanges may be turned down from the position shown in dotted lines in Fig. 1 to the position shown in full lines in said figure, and when used in combination with angle irons or fish plates having elongated perforations extending longitudinally and with bolts having oblong neck portions mounted in such elongated perforations, so as to be held against rotation, the rotation of the bolts and loosening of the nuts thereon is effectually prevented.

By the above arrangement it will be seen that while the rotation of the bolts and the loosening of the nuts is prevented, the angle irons or fish plates are effectually held in position, and at the same time an efficient means is provided for permitting the relative movements between the rails and fish plates due to expansion and contraction of the rails, whereby injury to the parts by reason of such expansion and contraction is prevented, and an efficient rail joint mechanism provided having securely locked bolt and nut mechanism. The perforations in the fish plates and the necks of the bolts—as above described—are so formed that when the bolts are in operative position the upper and lower walls of their neck portions engage both the upper and lower walls of the perforations in the fish plates, and the necks of the bolts thus serve to strengthen and brace the portions of the fish plates which are weakened by the perforations. At the same time the bolts are held against rotation and the loosening of the nuts prevented while permitting expansion and contraction without injury to the parts.

I claim:

In a rail-joint a fish plate provided with rectangular oblong openings, the greater dimensions of said openings extending in the direction of the length of said fish plate, bolts provided with rectangular neck portions of a size substantially equal to the shorter dimensions of the opening in said fish plate, thus leaving clearance between the necks of the bolts and the ends of said openings, nuts for said bolts and locking members to prevent rotation of the nuts, said nuts being of a size to completely overlap the edges of the said oblong openings when the bolts are centrally disposed through the same, said locking members consisting of large thin plates to be clamped under the nuts and bent down over the same.

EDWARD POSSON.

Witnesses:
HARRY I. CROMER,
ANNIE C. COURTENAY.